Feb. 28, 1961 T. L. MENGE, SR 2,972,910
SPEED REDUCER
Filed June 6, 1958
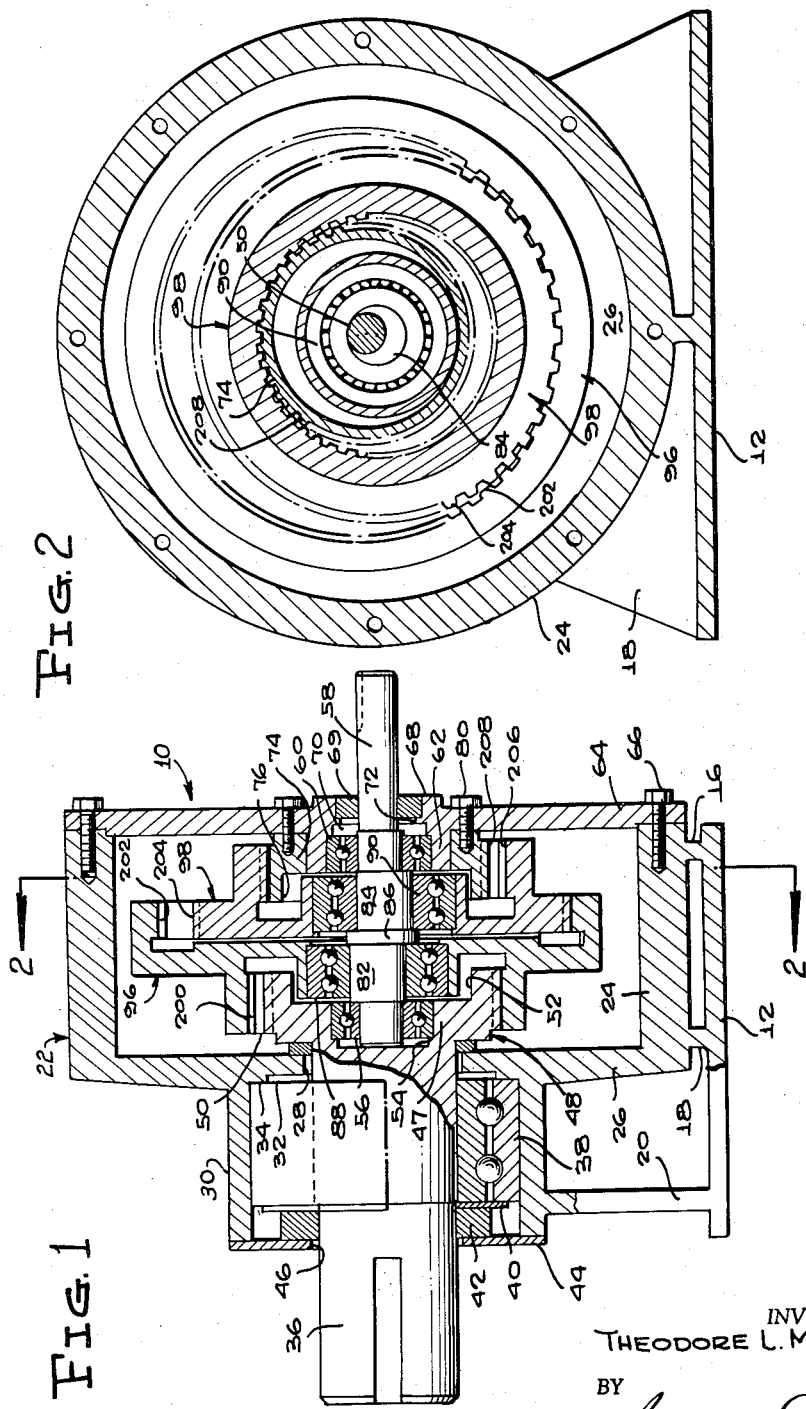
INVENTOR.
THEODORE L. MENGE, Sr.
BY
ATTORNEYS

… …

United States Patent Office 2,972,910
Patented Feb. 28, 1961

2,972,910

SPEED REDUCER

Theodore L. Menge, Sr., Shreveport, La., assignor of sixteen and two-thirds percent to Abury H. Temple, fifty percent to William C. Randolph, and thirty-three and one-third percent to Temple Iron Works, Inc., all of Shreveport, La.

Filed June 6, 1958, Ser. No. 740,364

2 Claims. (Cl. 74—804)

This invention relates to a gear train and, more specifically, this invention pertains to a gear train especially designed for effecting a speed reduction of a power output shaft with respect to the speed of a power input shaft.

One of the primary objects of this invention is to provide a speed reducer which is essentially silent in operation and which is substantially free of vibration and pulsation.

A further object of this invention is to provide a speed reducer which will handle large loads and torques with ease and wherein substantially uniform torque and speed relations may be obtained.

Another object of this invention is to provide a speed reducer which will operate at a high efficiency and wherein the component elements thereof need not be manufactured with extremely close tolerances.

Still a further object of this invention is to provide a speed reducer, the output shaft of which may be made to rotate in the same direction as the input shaft or in a direction contra to the direction of rotation of the input shaft, or, under some circumstances, the output shaft may be held at zero r.p.m. regardless of the direction of rotation of the input shaft or of its speed, all being accomplished without the interposition of clutch means.

Still another object of this invention is to provide a speed reducer including a gear train wherein the load is at all times distributed over a plurality of teeth instead of one, or at the most, two teeth, as in conventional trains of spur gears.

This invention contemplates, as a still further object thereof, the provision of a speed reducer which is non-complex in construction and assembly, inexpensive to manufacture, and durable in use.

Other and further objects and advantages of the instant invention will become more evident from the consideration of the following specification when read in conjunction with the annexed drawings, in which:

Figure 1 is a detail longitudinal cross-sectional view of a speed reducer according to this invention; and, Figure 2 is a detail cross-sectional view taken substantially on the vertical plane of line 2—2 of Figure 1, looking in the direction of the arrows.

Referring now more specifically to the several drawings, reference numeral 10 designates, in general, a speed reducer constructed in accordance with the teachings of this invention. The device 10 includes an elongated substantially rectangular base 12, and integral with the base 12 and projecting laterally at substantially right angles from a side thereof are a plurality of webs 16, 18, 20 which, in turn, are integral with or otherwise rigidly secured to a substantially hollow cylindrical housing connoted, generally, by reference numeral 22. As is seen in Figures 1 and 2, the webs 16, 18 at their respective outer ends are integrally connected to the opposed ends, respectively, of the cylindrical side wall 24 of the housing 22, one end of the side wall 24 being closed by an end wall 26 having a central aperture 28 extending transversely therethrough to serve a function to be described.

The housing 22 also includes a substantially hollow cylindrical extension member 30 which projects laterally and outwardly from the end wall 26 in coaxial alignment with the aperture 28, and the end wall 26 immediately adjacent the latter is formed with a circumferential groove 32 giving rise to a circumferential shoulder 34, both of the latter being coaxial with respect to the aperture 28 and surrounded by the extension member 30. As is seen in the drawings, the outer end of the extension member 30 is rigidly supported by the web 20 with which it is, preferably, integrally connected.

One end of a power output shaft 36 extends through the aperture 28 and is rotatably journalled in a roller bearing 38, the latter being press fit within the extension member 30 into abutting relation against the shoulder 34. The outer end of the power output shaft 36 projects beyond the outer end of the extension member 30 for connection with the work to be driven. Engaged around and abutting against the other side of the bearing 38 is an annular member 40 against which one side of an oil seal ring 42 abuts. As is seen in Figure 1, the oil seal ring 42 surrounds the shaft 36 and is disposed within the extension member 30 with its other side engaging against a keeper plate 44 which is centrally apertured at 46 to permit the outer end of the output shaft 36 to project loosely therethrough. Suitable means, conventional in the art, but not illustrated in the drawings, secure the keeper 44 to the outer end of the extension member 30.

The inner end of the power output shaft 36 is integrally connected with the hub 47 of a spur gear 48 having a plurality of teeth 50 circumferentially spaced thereon and extending substantially parallel to the axis of the shaft 36. To serve functions to be described below, the inner side of the hub 47 is axially bored at 52, the inner end of which is in open communication with a coaxial counterbore 54, the latter having a roller bearing 56 press-fit therein.

The inner end of a power input shaft 58 is journalled for rotation in the bearing 56, and adjacent its outer end the shaft 58 is journalled for rotation in a roller bearing 60 press-fit within a substantially hollow cylindrical boss 62 which projects laterally from a side of a disc-shaped cover plate 64 releasably secured to the other end of the side wall 24 by bolts 66. As is seen in Figure 1, the cover plate 64 is also formed with an integral hollow cylindrically extending boss 68 coaxially aligned with the boss 62 and the common wall 70 therebetween is apertured at 72 to permit the outer end of the shaft 58 to project therethrough and through the boss 68 for extension therebeyond. The outer end of the shaft 58 is adapted for connection with a rotary power source not shown. As is seen in the drawings, the boss 68 receives an oil seal ring 69 which surrounds the shaft 58.

The hub 74 of a second spur gear 76 is centrally apertured and is telescoped over the boss 62, the spur gear 76 having a plurality of circumferentially spaced teeth 78 extending substantially parallel to the longitudinal axis of the shaft 58. Bolts 80 extend through the cover plate 64 and are threaded into the spur gear 76 to hold the same stationary.

The shaft 58 is provided with a pair of cylindrical eccentrics 82, 84 intermediate its ends, the eccentrics being of identical configuration with the high sides thereof being disposed 180 degrees apart with respect to each other and being separated by a spacer collar 86. Roller bearings 88, 90 are mounted on each of the eccentrics 82, 84, respectively, the bearings being press-fit within the hubs 92, 94 of a pair of internal spur gears 96, 98.

It is seen that the internal spun gear 96 is provided with lateral extending teeth 200 which are adapted to mesh with the teeth 50 formed on the spur gear 48. Projecting laterally from the other side of the internal spur gear 96 are teeth 202 which are adapted to mesh with teeth 204 formed on the internal spur gear 98. The internal spur gear 98 is formed with a second set of teeth 206 which are adapted to mesh with the teeth 208 formed on the spur gear 76.

In this embodiment of the invention let the teeth 208 be designated by $a$, the teeth 206 be indicated by $b$, the teeth 50 be represented by the letter $c$, the teeth 200 be designated by $d$, the teeth 204 be indicated by $e$ and the teeth 202 be designated by $f$. Now, when the input shaft 58 makes one revolution, the internal spur gear 98 will rotate forward $$\frac{(b-a)}{b}$$

turns as shown previously. The rotation of the gears 96, 98 due to the rotation of the eccentrics 82, 84 cause the gear teeth 202, 204 to wrap on each other. If the gear 98 does not rotate and is provided with $e$ teeth, as defined above while the internal spur gear 96 has $f$ teeth, then only $e$ teeth are used on the gear 96 in this motion. Therefore, the internal spur gear 96 will advance $f-e$ teeth or $$\frac{(f-e)}{f}$$

turns with respect to the gear 98.

But the gear 98 advances $$\frac{(b-a)}{b}$$

turns which causes the internal spur gear 96 to advance $$\frac{(b-a)}{b} \cdot \frac{e}{f}$$

turns. Hence, the total advance of the gear 96 is:

$$\frac{b-a}{b} \cdot \frac{e}{f} + \frac{f-e}{f} = \frac{bf-ae}{bf}$$

turns.

One complete rotation of the internal spur gear 96 about the gear 48 results in the backward rotation of the gear 48 by $$\frac{(d-c)}{c}$$

turns. But since the gear teeth 200 are rigid with the internal spur gear 96 as are the teeth 202, the internal spur gear 96 must turn forward by the same amount. Consequently, the net advance of the spur gear 47 is $$\frac{bf-ae}{bf} \cdot \frac{d}{c} - \frac{d-c}{c} = \frac{bcf-ade}{bcf}$$

turns.

The speed ratio is then $$\frac{\text{R.p.m. of output}}{\text{R.p.m. of input}} = \frac{bcf-ade}{bcf}$$

Assuming that the gear teeth 202, 204 all have the same pitch, it will be found that the difference in numbers of teeth thereof must be twice that between the numbers of the teeth 206, 208 or of the teeth 50, 200. That is, if $b-a=n$ then $f-e=2n$. If this relation is not maintained, the gear teeth 202, 204 will not mesh properly. The relative sizes of the gears are governed in part by the throw of the eccentrics and cannot be chosen at random. Nevertheless, the number of combinations possible is very great.

It should also be noted that other modifications may be made without departing from the spirit and scope of this invention. For example, the fixed spur gear 76 could be a ring gear and the internal spur gear 98 could be a spur gear designed to engage the spur gear 76 internally. Such a change would remain within the scope of this invention since the same merely provides another output-input speed ratio. Further, the relative engagements of the internal spur gears 96, 98 and of the internal spur gear 96 with the spur gear 48 may be altered in a similar fashion.

Having described and illustrated one embodiment of this invention in detail, it will be understood that the same is offered merely by way of example, and that this invention is to be limited only by the scope of the appended claims.

What is claimed is:

1. A speed reducer comprising a substantially hollow housing having a pair of opposed open ends, a closure member for each of said open ends, a power input shaft extending through one of said closure members and journalled for rotation within said housing, said shaft having a pair of identical eccentric portions formed thereon and disposed 180 degrees out of phase with respect to each other, a spur gear disposed within said housing and fixedly secured to said one closure member in coaxial alignment with said power input shaft, a first internal spur gear mounted on one of said eccentrics and having a first series of teeth meshing with the teeth of said first spur gear, said first internal spur gear having a second series of teeth formed thereon, a second internal spur gear having a first series of teeth meshing with said second series of teeth on said first internal spur gear, said second internal spur gear having a second series of teeth formed thereon, a power output shaft extending through the other of said closure members and journalled for rotation within said housing, a second spur gear fixedly secured on said power output shaft and having teeth thereon meshed with said second series of teeth on said second internal spur gear.

2. A speed reducer comprising a substantially hollow housing having a pair of opposed open ends, a closure member for each of said open ends, a power input shaft extending through one of said closure members and journalled for rotation within said housing, said shaft having a pair of identical eccentric portions formed thereon and disposed 180 degrees out of phase with respect to each other, a spur gear disposed within said housing and fixedly secured to said one closure member in coaxial alignment with said power input shaft, said spur gear having $a$ teeth formed thereon, a first internal spur gear mounted on one of said eccentrics and having a first series of $b$ number of teeth meshing with the teeth $a$ of said first spur gear, said first internal spur gear having a second series of $e$ number of teeth formed thereon, a second internal spur gear having a first series of $f$ number of teeth meshing with said second series of teeth on said first internal spur gear, said second internal spur gear having a second series of $d$ number of teeth formed thereon, a power output shaft extending through the other of said closure members and journalled for rotation within said housing, a second spur gear fixedly secured on said power output shaft and having $c$ number of teeth thereon in mesh with said second series of teeth on said second internal spur gear, and wherein number of teeth $(b-a=n$ number of teeth and $d-c=n$ $f-e=2n$ number of teeth and wherein the speed reduction ratio is then expressed by the equation $$\frac{\text{R.p.m. of output}}{\text{R.p.m. of input}} = \frac{bcf-ade}{bcf}$$

(References on following page)

References Cited in the file of this patent

UNITED STATES PATENTS

| | | |
|---|---|---|
| 1,767,866 | Wildhaber | June 24, 1930 |
| 1,831,903 | Crisman et al. | Nov. 17, 1931 |
| 2,108,384 | Moisy | Feb. 15, 1938 |
| 2,168,164 | Kittredge | Aug. 1, 1939 |
| 2,170,951 | Perry | Aug. 29, 1939 |
| 2,788,196 | Jacobi et al. | Apr. 9, 1957 |
| 2,837,937 | Kraus | June 10, 1958 |

FOREIGN PATENTS

| | | |
|---|---|---|
| 1,066,672 | France | Jan. 20, 1954 |
| 1,114,484 | France | Apr. 12, 1956 |